United States Patent Office 2,995,547
Patented Aug. 8, 1961

2,995,547
PREPARATION OF ISOOLEFIN POLYMERS WITH SILICONES AS SLURRYING ACIDS
George Francis Sellen and Louis Earl Pirkle, Baton Rouge, La., assignors to Esso Research and Engineering Company, a corporation of Delaware
No Drawing. Filed Sept. 17, 1959, Ser. No. 840,517
7 Claims. (Cl. 260—85.3)

This invention relates to the preparation of isoolefin polymers and relates more particularly to an improved method for the dispersing of the polymerization reactor effluent in hot water or other liquid while flashing off the diluent and unreacted monomers.

It is known that high molecular weight synthetic polymers of an isoolefin, such as isobutylene, or copolymers of an isoolefin with a diolefin, such as isoprene, can be produced by the use of a low-temperature technique in which the reacting hydrocarbons are cooled to a temperature ranging from −20° C. to −160° C. or lower by the admixture therewith of a diluent-refrigerant, such as liquid ethylene or other lower boiling liquid hydrocarbon; or by the use of solid carbon dioxide; or by suitable external refrigeration of the reactor. In such cases, the reactants are preferably admixed with a diluent, such as methyl chloride, and the catalyst is added as a solution in a low-freezing, inert solvent such as methyl or ethyl chloride or carbon disulfide. The catalyst which is an active halide catalyst, or Friedel-Crafts type catalyst, such as $AlCl_3$ or $AlBr_3$ or $TiCl_4$ or the like may be introduced; for example, by spraying it onto the surface of the rapidly stirred reactant mixture, or by mixing it directly into the body of the agitated liquid. The reaction begins promptly and may approach complete polymerization in a few minutes. The polymer forms as a slurry in the methyl chloride diluent and overflows from the reactor into a flash tank containing water at a temperature of about 35°–100° C. In order to prevent the polymer from agglomerating when the reactor slurry is introduced into the water and to produce a finely divided slurry, a dispersing agent is added to the water in the flash tank. Conventional dispersing agents include the stearates of aluminum, zinc, magnesium, and calcium, as well as the similar salts of palmitic and other high molecular weight fatty acids. Zinc stearate is generally the preferred and most used of these dispersing aids. While these dispersing aids have been found to be reasonably successful in commercial plant operation, nevertheless at times the polymer does agglomerate causing lines to plug and occasionally forcing plant shut-downs.

In accordance with the present invention, it has been found that solutions of silicon dioxide in polymethyl-siloxanes containing 1–10% of dissolved $SiO_2$ and known as silicones are unexpectedly superior as polymer dispersing agents in place of, or in conjunction with, the conventional slurry aids. By the use of these silicones it was found that the polymer in the polymerization reactor effluent can be more readily converted into discrete particles in the flash tank water.

Broadly, the present invention consists of the steps of preparing a reactive mixture of the desired olefinic material at the desired low temperature as taught in U.S. Patent 2,356,127 of Thomas and Sparks and U.S. Patent 2,356,128 of Sparks. Generally, it is desirable to use isoolefins having from four to about seven carbon atoms, the reaction material being preferably isobutylene with or without a minor proportion of a multi-olefin having 4 to 10 carbon atoms, e.g., a conjugated diolefin, such as butadiene or isoprene or 2,3-dimethyl butadiene-1,3; or piperylene; or a nonconjugated diolefin, such as 2-methyl-hexandiene-1,5; 2,6-dimethylhexadiene-1,5; or triolefins, such as hexatriene, myocene, 1,6-dimethyl heptatriene-1,3,5 and 2,4,6-trimethyl-1,3,5-hexatriene or other olefins having a plurality of double bonds. One or more additional hydrocarbon reactants may also be present, such as small amounts of divinyl benzene, cyclopentadiene, methylcyclopentadiene, and the like. The mixture is cooled by internal or external refrigeration, e.g., by liquid ethylene, to a temperature ranging from −20° to −160° C. or lower. To this mixture is added a Friedel-Crafts type active halide catalyst which may be boron fluoride or aluminum chloride in finely divided solid form or dissolved in an inert, low-freezing solvent. Other similar active metal halides, such as $TiCl_4$ or $ZrCl_4$ may be used. A diluent, non-solvent for the polymer is normally employed in the reaction zone. Particularly suitable diluents are the lower halo alkanes, methyl and ethyl chloride. However, polymer solvents may be employed instead. Suitable solvents are hexane, heptane, carbon disulfide, and the like. The polymer forms as a slurry or as a solution depending upon the diluent used.

When the polymerization has reached the desired stage of completion, it is passed to a flash tank containing warm water at 35°–100° C. (100°–212° F.) to volatilize out most of the volatile components and at the same time deactivate the catalyst and wash it out of the polymer. It is necessary that the polymer be maintained in a form which is easy to pump and which will not agglomerate to plug up the lines.

It is the main feature of this invention that the polymer can be maintained in a finely divided form which will not agglomerate by adding to the water a small amount, e.g., 30 to 60 p.p.m. based on the polymer produced, of a solution of 1 to 10% $SiO_2$ in polymethyl-siloxanes having the general formula:

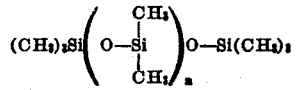

These compounds are known in the art as silicones and are prepared in accordance with the teachings of U.S. Patent No. 2,490,357 of Hyde. They have viscosities ranging from 30,000 to 10,000,000 centipoise. Those most often used, however, have viscosities of about 60,000 centipoise. They may be used alone or in the presence of conventional polymer dispersing aids, such as zinc stearate, calcium stearate, and the like. The silicone coats the surface of the polymer particles as they come from the reactor and reduces the surface tack thereby reducing the tendency of the particles to adhere to each other or to the equipment or lines used in separating the polymer from the water.

The following example illustrates the operation of this invention:

Example I

In a series of commercial plant scale operations involving the production of polyisobutylene (Vistanex) and copolymers of a major proportion of isobutylene and a minor proportion of isoprene (butyl rubber) the overflow from the reactor in each case, consisting of a dispersion of polymer or copolymer in methyl chloride, was flowed continuously into a tank containing water at 100°–212° F. to which had been added 30 to 60 parts, per million of total polymer or copolymer produced, of a 36% solution of $SiO_2$ in polymethyl siloxane having a viscosity of about 60,000 centipoise. The polymer remained as a slurry in the water and showed little or no tendency to agglomerate. Difficulties connected with the handling of the polymer or copolymer slurry decreased as compared to those experienced when zinc stearate was used as the slurry aid. It was also found possible to operate at higher production rates and to use higher concentrations of polymer slurry than with zinc stearate. Furthermore, there was less fouling of the perforated screens used in the tunnel driers for removing water from the polymer because the coating of silicone was maintained on the polymer particles throughout the finishing steps. In addition to all of this, no degrading of the polymer or copolymer product was experienced.

The nature of the present invention having thus been described and specific examples of the same given, what is claimed as new and useful and desired to be secured by Letters Patent is:

1. The process which comprises polymerizing an isoolefin of 4 to 7 carbon atoms at a temperature between −20° and −160° C. in contact with a Friedel-Crafts catalyst to form a polymer, discharging said polymer into heated water containing a solution of 1–10% silicon dioxide in polymethyl siloxane having a viscosity between 30,000 and 10,000,000 centipoise to flash off the volatile reaction liquid and maintain the polymer in finely divided form, and separating the polymer particles from the water.

2. Process according to claim 1 in which a halo alkane diluent of 1 to 2 carbon atoms is present during the polymerization.

3. Process according to claim 2 in which the isoolefin is isobutylene.

4. Process according to claim 3 in which the polymethylsiloxane has a viscosity of about 60,000 centipoise.

5. Process according to claim 2 in which a minor proportion of a multiolefin having 4 to 10 carbon atoms is present along with the isoolefin during the polymerization.

6. Process according to claim 5 in which the multiolefin is isoprene.

7. Process according to claim 6 in which the polymethylsiloxane has a viscosity of about 60,000 centipoise.

References Cited in the file of this patent

UNITED STATES PATENTS

| | | |
|---|---|---|
| 2,462,123 | Nelson | Feb. 22, 1949 |
| 2,846,458 | Haluska | Aug. 5, 1958 |
| 2,881,146 | Remer et al. | Apr. 7, 1959 |

OTHER REFERENCES

Dow Corning Note Book-Fluid Series No. 3, Sept. 1948.